(12) United States Patent
Chan et al.

(10) Patent No.: US 7,991,752 B2
(45) Date of Patent: Aug. 2, 2011

(54) MANAGING AND COORDINATING SAVEPOINT FUNCTIONALITY IN A DISTRIBUTED DATABASE SYSTEM

(75) Inventors: Yuk Kuen Chan, Markham (CA); Amy Chang, San Jose, CA (US); Yin Ling Cheung, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/847,226

(22) Filed: Aug. 29, 2007

(65) Prior Publication Data

US 2009/0063579 A1    Mar. 5, 2009

(51) Int. Cl.
*G06F 17/30* (2006.01)
(52) U.S. Cl. .............. 707/703; 707/792; 707/800
(58) Field of Classification Search .............. None
See application file for complete search history.

(56) References Cited

U.S. PATENT DOCUMENTS

| | | | |
|---|---|---|---|
| 5,630,124 A | 5/1997 | Coyle, Jr. et al. | |
| 6,047,285 A | 4/2000 | Jacobs et al. | |
| 6,816,873 B2 | 11/2004 | Cotner et al. | |
| 6,898,608 B2 | 5/2005 | Hopeman et al. | |
| 7,185,005 B1 | 2/2007 | Long et al. | |
| 2002/0174108 A1* | 11/2002 | Cotner et al. | 707/3 |
| 2006/0004757 A1 | 1/2006 | Watts | |
| 2006/0136505 A1 | 6/2006 | Bird et al. | |
| 2006/0155946 A1* | 7/2006 | Ji | 711/162 |
| 2006/0195485 A1 | 8/2006 | Bird et al. | |

OTHER PUBLICATIONS

Samaras, G., S.D. Nikolopoulos, K. Britton, and A. Citron, "Transaction Identifier Management in the Peer-to-Peer Distributed Transactional Environment", in Proceedings of the 9th International Conference on Parallel and Distributed Computing Systems, vol. 2, Sep. 1996, pp. 796-803.

* cited by examiner

*Primary Examiner* — Mohammad Ali
*Assistant Examiner* — Syed H Hasan
(74) *Attorney, Agent, or Firm* — Janaki K. Davada; Konrad Raynes & Victor LLP

(57) ABSTRACT

Provided are techniques for savepoint processing. One of a savepoint statement, a rollback to savepoint statement, and a release savepoint statement is received. It is determined whether to propagate the received one of the savepoint statement, the rollback to savepoint statement, and the release savepoint statement to a data source based on an asymmetrical model in which a nested level of savepoints on a federated server side is capable of being greater than a nested level of savepoints on a data source side and wherein a two-tiered data structure is used to preserve savepoint information in the asymmetrical model. In response to determining that propagation is to occur, the one of the savepoint statement, the rollback to savepoint statement, and the release savepoint statement is propagated to the data source.

27 Claims, 18 Drawing Sheets

Example #1
Event Steps:
    APP SVPT SP1 (svpt_id = 10)
    APP SVPT SP2 (svpt_id = 11)
    do something at data source
    APP SVPT SP3 (svpt_id = 13)
    5a. APP SVPT SP2 (svpt_id = 14); or 5b. APP SVPT SP1 (svpt_id = 14);
    APP SVPT SP1 (svpt_id = 15); following step 5a;

- FEDERATED APPLICATION SAVEPOINT design

At step 1.
SQL statement issued to the data source(s):
  <to DS1> None
1) On the Federated database:
    SP1 svpt cb; svpt_id = 10
2) On the DS1 data source
    None

At step 2.
SQL statement issued to the data source(s):
  <to DS1> None
1) On the Federated database:
    SP1 svpt cb; svpt_id = 10
    SP2 svpt cb: svpt_id = 11
2) On the DS1 data source
    None

At step 3.
SQL statement issued to the data source(s):
  <to DS1> SAVEPOINT DB2_svpt_11;
1) On the Federated database:
    SP1 svpt cb; svpt_id = 10
    SP2 svpt cb: svpt_id = 11
      DS1 svpt cb: DB2_svpt_11
2) On the DS1 data source
    DB2_svpt_11 svpt cb: svpt_id = 200
    *federated update*

At step 4. APP SVPT SP3 (svpt_id = 13)
SQL statement issued to the data source(s):
   <to DS1> None
1) On the Federated database:
   SP1 svpt cb; svpt_id = 10
   SP2 svpt cb: svpt_id = 11
      DS1 svpt cb: DB2_svpt_11
   SP3 svpt cb: svpt_id = 13
2) On the DS1 data source
   DB2_svpt_11 svpt cb: svpt_id = 200
*federated update*

At step 5a. APP SVPT SP2 (svpt_id = 14);
SQL statement issued to the data source(s):
   <to DS1> None
1) On the Federated database:
   SP1 svpt cb; svpt_id = 10
      DS1 svpt cb: DB2_svpt_11
   ~~SP2 svpt cb: svpt_id = 11~~
      ~~DS1 svpt cb: DB2_svpt_11~~
   SP3 svpt cb: svpt_id = 13
   SP2 svpt cb: svpt_id = 14
2) On the DS1 data source
   DB2_svpt_11 svpt cb: svpt_id = 200
*federated update*

At step 5b. APP SVPT SP1 (svpt_id = 14);
SQL statement issued to the data source(s):
   <to DS1> None
1) On the Federated database:
   ~~SP1 svpt cb; svpt_id = 10~~
   SP2 svpt cb: svpt_id = 11
      DS1 svpt cb: DB2_svpt_11
   SP3 svpt cb: svpt_id = 13
   SP1 svpt cb; svpt_id = 14
2) On the DS1 data source
   DB2_svpt_11 svpt cb: svpt_id = 200
*federated update*

FIG. 10B

At step 6 following step 5a. APP SVPT SP1 (svpt_id = 15);
SQL statement issued to the data source(s):
   <to DS1> SAVEPOINT DB2_svpt_11;
   <to DS1> RELEASE SAVEPOINT DB2_svpt_11;
1) On the Federated database:
   ~~SP1 svpt cb; svpt_id = 10~~
     ~~DS1 svpt cb: DB2_svpt_11~~
   SP3 svpt cb: svpt_id = 13
   SP2 svpt cb: svpt_id = 14
   SP1 svpt cb; svpt_id = 15
2) On the DS1 data source:
   *** After executing SAVEPOINT DB2_svpt_11;
   ~~DB2_svpt_11 svpt cb: svpt_id = 200~~
   *federated update*
   DB2_svpt_11 svpt cb: svpt_id = 202

*** After executing RELEASE SAVEPOINT DB2_svpt_11;
   *federated update*
   ~~DB2_svpt_11 svpt cb: svpt_id = 202~~

FIG. 10C

MANAGING AND COORDINATING SAVEPOINT FUNCTIONALITY IN A DISTRIBUTED DATABASE SYSTEM

BACKGROUND

1. Field

Embodiments of the invention relate to managing and coordinating savepoint functionality in a distributed database system.

2. Description of the Related Art

A DataBase Management System (DBMS) may use a Structured Query Language (SQL) interface. The SQL interface has evolved into a standard language for RDBMS software and has been adopted as such by both the American National Standards Institute (ANSI) and the International Standards Organization (ISO). A DBMS stores data in and retrieves data from one or more databases. Each database may be organized into tables that consist of rows and columns of data. The rows may be called tuples or records or rows. A database typically has many tables, and each table typically has multiple records and multiple columns.

Statement savepoint may be described as an internal database protection mechanism to protect statement level atomicity. With statement level atomicity, the effect of a database update produced during a statement execution is either all in or none at the end of the statement execution. If the DBMS encounters an error during the execution of a SQL statement that modifies database objects, the statement savepoint may safely and cleanly undo all the operations associated with this SQL statement so that at the end of the statement execution, the database state is restored to the original state prior to the statement execution. Statement savepoint may be described as an implicit under the cover operation.

In addition to statement savepoint, there is an application savepoint. An application savepoint may be set within an application, and, later, the application savepoint may either be released or rolled back. Releasing an application savepoint ends the savepoint, and there is no impact to the database update work performed. Rollback of an application savepoint, on the other hand, undoes all the database update work that has been performed since the application savepoint was set. There may be any number of savepoints within a single transaction. A transaction may be described as a sequence of database operations that are treated as a unit of work with "ACID" properties (i.e., a transaction is Atomic, produces Consistent results, is Isolated and is Durable). Application savepoint provides control over the work performed by a subset of SQL statements in a transaction. Application savepoint may be described as an explicit request issued by the application. Application savepoints may be nested.

A federated system may be described as consisting of a federated server (e.g., a DB2® instance that operates as a federated server (DB2 is a trademark of International Business Machines Corporation in the United States, other countries, or both)), a database that acts as a federated database, one or more heterogeneous or homogeneous data sources, and clients that access the federated database and data sources. A federated server may be described as providing the client with access to the heterogeneous or homogeneous data sources as if they resided in a single site. A federated database may be described as a database on the federated server instance containing metadata information about data stored on the local database as well as data stored on the data sources. In a federated system, data residing in local or remote data sources may be accessed in a single SQL statement as if data resides in a single site. Under the cover, one SQL statement may be broken into a local portion and one or more remote portions. The local portion of the SQL statement accesses the local database, while each remote portion of the SQL statement accesses a remote data source. Also each remote portion may be translated to a SQL statement that is executable in the remote data source (e.g., the remote portion is written in a dialogue understood by the remote data source).

A federated statement savepoint is used to protect statement level atomicity in a federated system. A federated server administers federated statement savepoint under the cover such that the federated server may safely and cleanly undo all the remote update operations on behalf of a SQL statement in the event of error. The federated statement savepoint may be described as having the following characteristics: 1) the federated statement savepoint is a statement savepoint on a federated server side and an application savepoint on a data source side; 2) the scope is one or more remote SQL statements bundled to provide savepoint functionality for one SQL statement; and 3) the federated statement savepoint is not nested (i.e., there is at most one federated statement savepoint at any time within a distributed transaction).

A federated application savepoint is used to provide control over the work performed by one or more SQL statements against a remote data source under the scope of application savepoint. The federated application savepoint may be described as having the following characteristics: 1) the federated application savepoint is an application savepoint on a federated server side and one or more application savepoints on a data source side; 2) the scope is one or more remote SQL statements bundled to provide savepoint functionality for one application savepoint; and 3) the federated application savepoint may be nested (i.e., there may be multiple application savepoints active at any time within a distributed transaction).

The following Example (1) is a usage example of a federated statement savepoint:

EXAMPLE (1)

```
// A federated statement savepoint is requested before any row insertion
takes place. If all rows are inserted successfully, at the completion of
insertion, the federated statement savepoint is released. If there is any
error, a rollback of the federated statement savepoint undoes all row
insertion associated with this statement execution.
INSERT INTO s1_nn01 (col01, col02) SELECT column_a column_c
FROM s2_nn02 WHERE column_b > 100;
```

In Example (1), the savepoint is implicit.

The following Example (2) is a usage example of federated application savepoint:

EXAMPLE (2)

```
SAVEPOINT sp1 ON ROLLBACK RETAIN CURSORS;
// SAVEPOINT
    sp1 sets a first application savepoint in a transaction;
SELECT * FROM s1_nn01 ORDER BY c11; // SELECT does not
    influence savepoint behavior
INSERT INTO s1_nn01 VALUES (-10,-10);   //INSERT needs a
    federated application savepoint protection against data source s1
SAVEPOINT sp2 ON ROLLBACK RETAIN CURSORS;
    // SAVEPOINT sp2 sets a second application savepoint in the
    transaction;
INSERT INTO s1_nn01 VALUES (-20, -20);   // INSERT needs a
    federated application savepoint protection against data source s1
```

-continued

```
INSERT INTO s2__nn02 SELECT * FROM s3__nn03; //INSERT needs
    federated statement savepoint protection against data source s2 as
    well as federated application savepoint protection against data
    source s2
SELECT * FROM s1__nn01;
SELECT * FROM s2__nn02;
ROLLBACK TO SAVEPOINT sp2; //rollback to application savepoint
    named sp2
SELECT * FROM s1__nn01;
SELECT * FROM s2__nn02;
INSERT INTO s1__nn01 VALUES (-30, -30);
ROLLBACK TO SAVEPOINT sp1; //rollback to application savepoint
    named sp1
SELECT * FROM s1__nn01;
SELECT * FROM s2__nn02;
RELEASE SAVEPOINT sp1; //release application savepoint named sp1
```

In Example (2), savepoints sp1 and sp2 are created. Then, rollback is performed to savepoint sp1, and savepoint sp1 is released.

There are many challenges for federated application savepoint support. A first challenge is savepoint name resolution to prevent name collision between the federated application savepoint names and the federated statement savepoint names. Both types of savepoints are sent to the data sources as application savepoints. The inbound savepoint name on the federated server side may not be propagated unchanged to the outbound savepoint name on the data source side because the inbound savepoint name may happen to be the same as the federated statement savepoint name or we may run into a name collision when the data source itself is also a federated server.

A second challenge is performance. If each savepoint is propagated out to the data sources, then there is a performance issue in propagating the savepoints for each savepoint taken at the federated server (e.g., the DB2® instance). If there are many data sources involved in the transaction, the performance on Insert/Update/Delete statements is impacted by the additional traffic for federated savepoints. DBMS customers may be concerned about avoiding any additional work to improve performance.

Thus, there is a need in the art for improved managing and coordinating savepoint functionality in a distributed database system.

SUMMARY OF EMBODIMENTS OF THE INVENTION

Provided are a method, computer program product, and system for savepoint processing. One of a savepoint statement, a rollback to savepoint statement, and a release savepoint statement is received. It is determined whether to propagate the received one of the savepoint statement, the rollback to savepoint statement, and the release savepoint statement to a data source based on an asymmetrical model in which a nested level of savepoints on a federated server side is capable of being greater than a nested level of savepoints on a data source side and wherein a two-tiered data structure is used to preserve savepoint information in the asymmetrical model. In response to determining that propagation is to occur, the one of the savepoint statement, the rollback to savepoint statement, and the release savepoint statement is propagated to the data source.

BRIEF DESCRIPTION OF THE DRAWINGS

Referring now to the drawings in which like reference numbers represent corresponding parts throughout:

FIGS. 10A, 10B, and 10C illustrate an example in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a technique for efficiently managing and coordinating savepoint functionality in a distributed database system. Embodiments support distributed savepoint functionality within a transaction in a distributed system.

Figure 1:
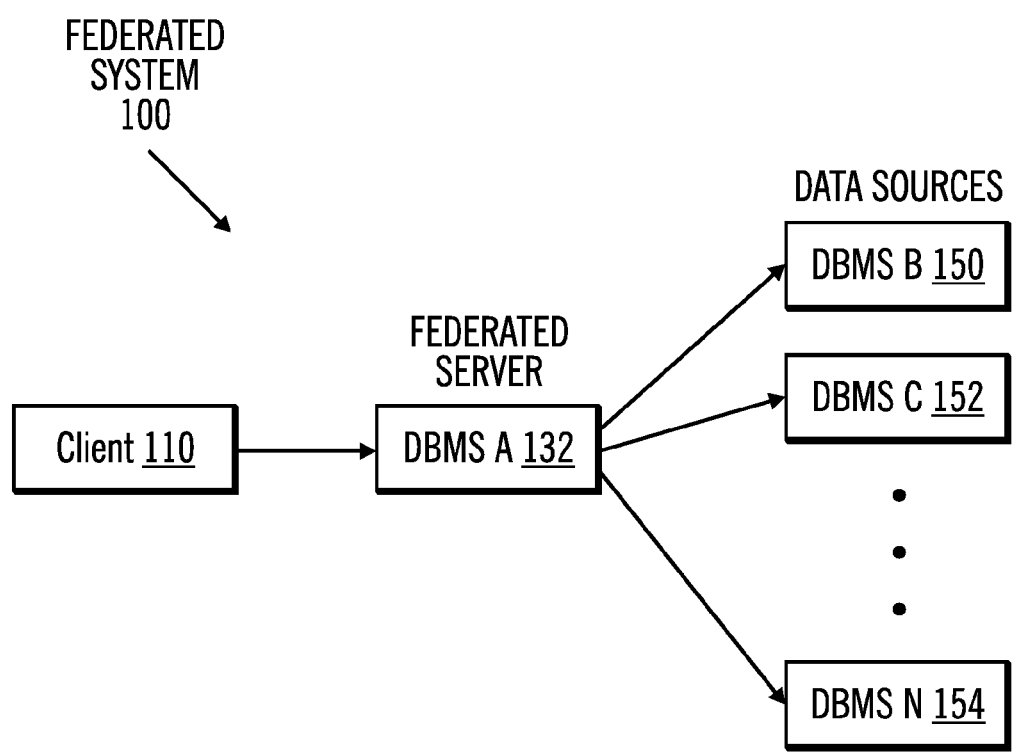
FIG. 1 illustrates a federated system with multiple data sources in accordance with certain embodiments.

FIG. 1 illustrates a federated system 100 with multiple data sources in accordance with certain embodiments. The federated system 100 includes a client 110, DBMS A 132, and data sources. DBMS A 132 is a federated database on a federated server instance that enables the client 110 to access the data sources. The data sources include DBMS B 150, DBMS C 152, . . . DBMS N 154 (where the ellipses are used to indicate that there may be additional data sources not shown).

Figure 2:
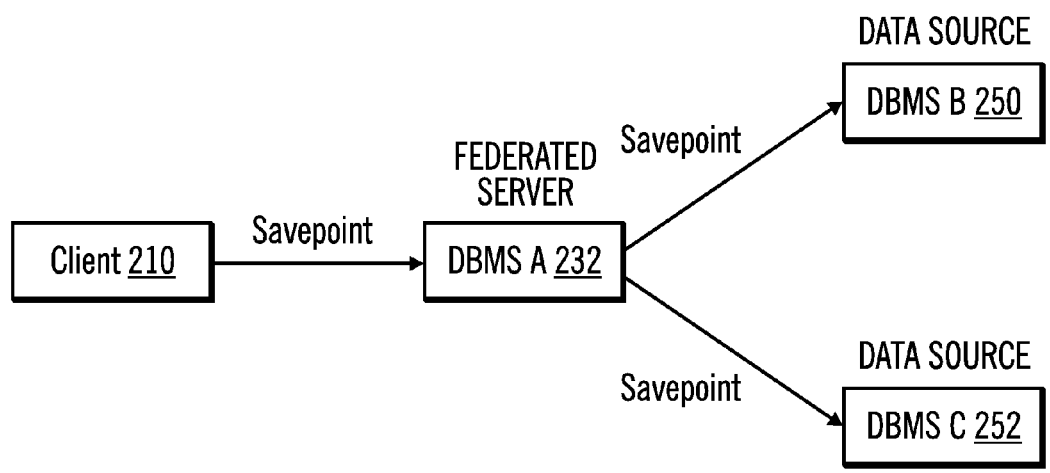
FIG. 2 illustrates a distributed transaction in accordance with certain embodiments.

FIG. 2 illustrates a distributed transaction in accordance with certain embodiments. In FIG. 2, DBMS A 232 is a federated database on a federated server, acting as a transaction coordinator to coordinate work performed on local database DBMS A 232, data source DBMS B 250, and data source DBMS C 252, on behalf of a single transaction. DBMS A 232 provides client 210 with access to data sources DBMS B 250 and DBMS C 252. In FIG. 2, the coordinator DBMS A 232 receives savepoint commands from client 210 and issues the savepoint requests to the data sources DBMS B 250 and DBMS C 252, and the data sources DBMS B 250 and DBMS C 252 receive the savepoint requests over the network. In this illustration, the data sources DBMS B 250 and DBMS C 252 do not issue any savepoint requests on their own.

Figure 3:
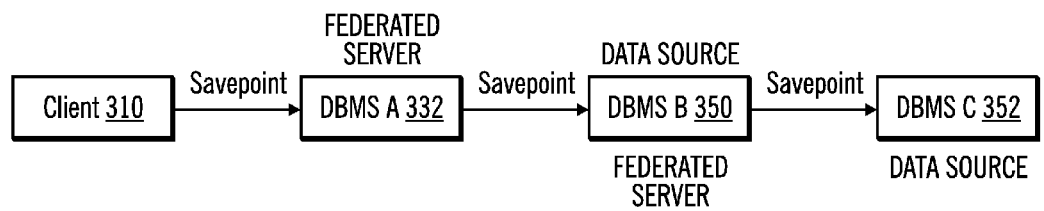
FIG. 3 illustrates a two-tiered distributed transaction in accordance with certain embodiments.

FIG. 3 illustrates a two-tiered distributed transaction in accordance with certain embodiments. For simplicity, one data source is shown on each federation server tier in the two-tiered architecture in FIG. 3. In FIG. 3, DBMS A 332 is a tier 1 federated server acting as a transaction coordinator for data source DBMS B 350 on a tier 1 data source. DBMS A 332 provides client 310 with access to data source DBMS B 350. DBMS B 350 is a tier 2 federated server acting as a transaction coordinator for data source DBMS C 372 on a tier 2 data source. In FIG. 3, the coordinator DBMS A 332 receives savepoint commands from client 310 and issues the savepoint requests to data source DBMS B 350. DBMS B 350 in turn issues the savepoint requests to DBMS C 352. In this illustration, DBMS C 352 does not issue any savepoint requests on its own.

Embodiments may be implemented with any DBMS that uses SQL (e.g., a Relational Database Management Systems (RDBMS)).

Embodiments provide a federated savepoint name resolution technique. To resolve a savepoint name collision problem, embodiments introduce an internal savepoint name generation mechanism in a form derived from a timestamp or counter depending on the savepoint type. For example, assuming the application savepoint is taken where the internal savepoint counter is X, then the internal savepoint name is <DBMS_NAME>_APPSPT_X (e.g., FED_APPSPT_2). For example, if a federated statement savepoint is required to ensure statement level atomicity, then the internal savepoint name is <DBMS_name>_STMTSPT_timestamp (e.g. FED_STMTSPT_061107204813). Name collision is not an issue if the external savepoint name matches the internal savepoint name because the internal savepoint name is used by the federated server and not by client applications.

Figure 4:
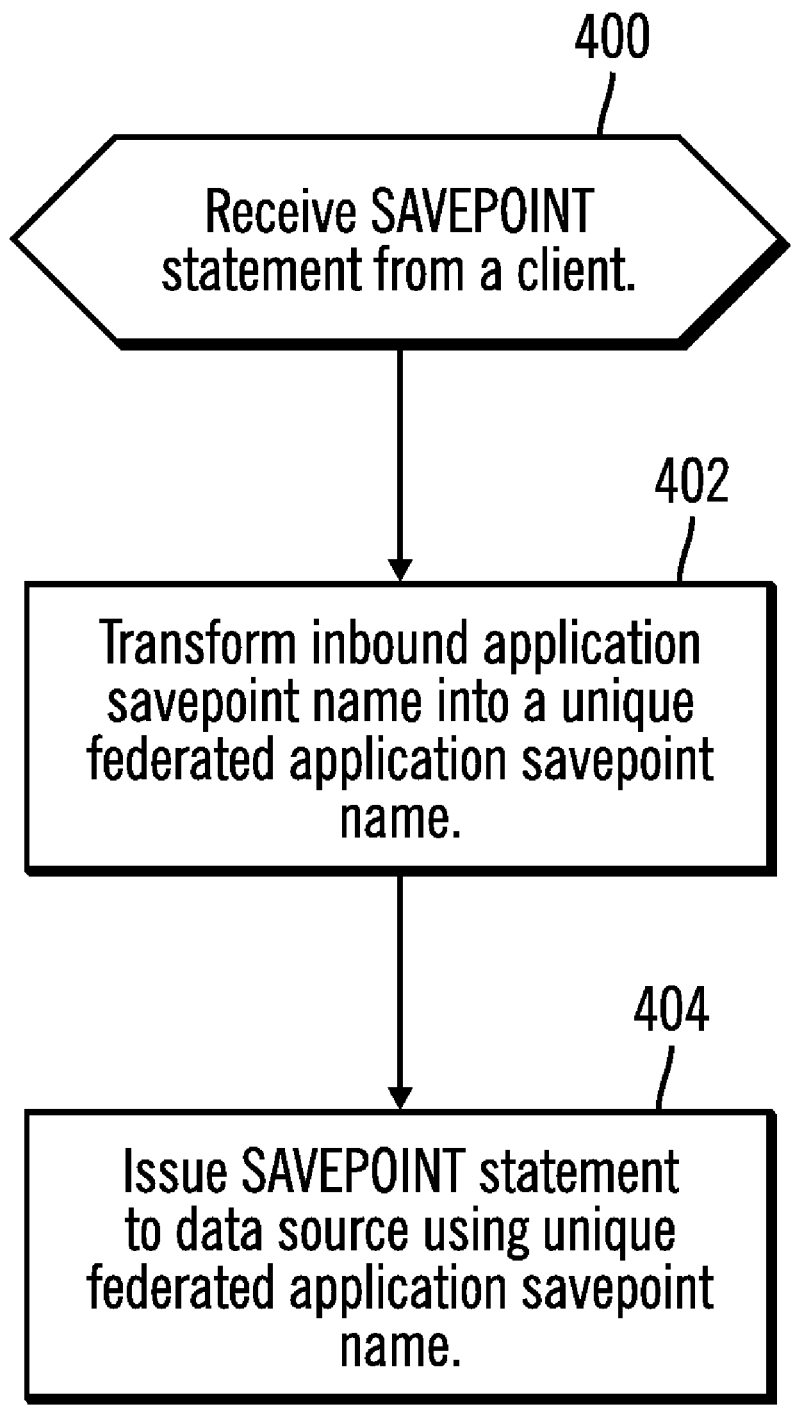
FIG. 4 illustrates logic performed for federated application savepoint name resolution in accordance with certain embodiments.

FIG. 4 illustrates logic performed for federated application savepoint name resolution in accordance with certain embodiments. Control begins at block 400 with a DBMS receiving a savepoint statement from a client. FIG. 4 illustrates the scenarios in which a federated application savepoint is to be generated because the database operation involves database update at a data source under the scope of an application savepoint. In block 402, the DBMS transforms the inbound application savepoint name into a unique federated application savepoint name. In block 404, the DBMS issues the savepoint statement to at least one data source using the unique federated application savepoint name.

In certain embodiments, the internal unique federated application savepoint name consists of a prefix label field identifying the name as a federated application savepoint type and an integer field identifying a counter value that is incremented by one per savepoint request.

Thus, for each inbound savepoint where the creation of a corresponding federated application savepoint is to be performed, the inbound savepoint name is transformed into a unique federated application savepoint name, which becomes the savepoint name specified on the savepoint request sent to the data source.

Figure 5:
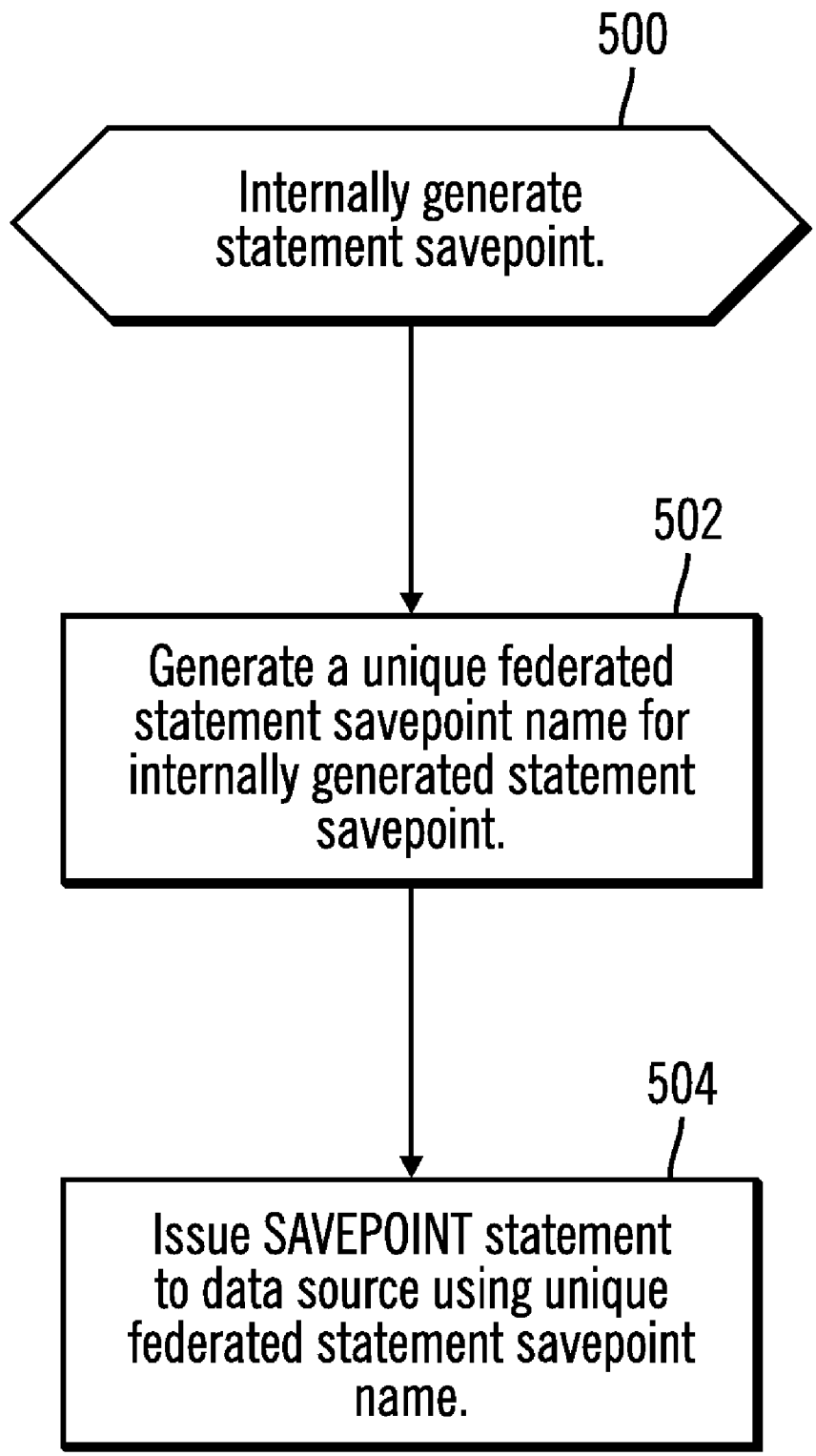
FIG. 5 illustrates logic performed for federated statement savepoint name resolution in accordance with certain embodiments.

FIG. 5 illustrates logic performed for federated statement savepoint name resolution in accordance with certain embodiments. Control begins at block 500 with a DBMS internally generating a statement savepoint. In block 502, the DBMS generates a unique federated statement savepoint name for the internally generated statement savepoint. In block 504, the DBMS issues the savepoint statement to at least one data source using the unique federated statement savepoint name.

In certain embodiments, the savepoint name of a federated statement savepoint consists of a prefix label field identifying it is a federated statement savepoint type and a timestamp field. The counter value is reset to zero at the end of a transaction.

Thus, for each internally generated federated statement savepoint, a unique savepoint name is assigned and specified on the savepoint request sent to the data source.

Embodiments provide a federated savepoint transport technique. To resolve the performance problem, embodiments introduce a concept of a two-tiered linked list (also referred to as bucket) collection for data sources for savepoints and a concept of linked list move up. The two-tiered linked lists are used on a federated database side. A data source that also acts as a federated database may also use the two-tiered linked lists. In certain embodiments, there is a federated savepoint linked list and a DBMS savepoint linked list. In the two-tiered linked list, a federated savepoint or federated savepoint linked list may be "anchored under" (i.e., connected to) a DBMS savepoint in a DBMS savepoint linked list. First, to eliminate unnecessary savepoint messages sent to the data sources, a federated application savepoint is not created immediately when the client sets an application savepoint. The federated application savepoint occurs at a later time when the distributed transaction attempts to update some object on the data source side. Second, to eliminate redundant savepoint messages sent to the data sources, for those data sources that have been accessed, the data sources are registered in the linked list inside the savepoint. If the data sources have been accessed more than one time within the scope of a current savepoint, the savepoint requests are not sent to the data sources. That is, embodiments do not send the same savepoint to the same data source more than once within the same savepoint scope, and so embodiments remember which data sources have been accessed for a savepoint scope. Third, to minimize the number of savepoints sent to the data sources in a nested savepoint environment, the federated application savepoint design adopts an asymmetrical model in which the nested level of savepoints on the federated server side may be greater than the nested level of savepoints on the data source side. A data structure (e.g., a linked list) move up mechanism is used to preserve savepoint information in this asymmetrical model.

The design of the federated savepoint transport technique is classified into three areas: request federated application savepoint, rollback to federated application savepoint, and release federated application savepoint.

Figure 6:
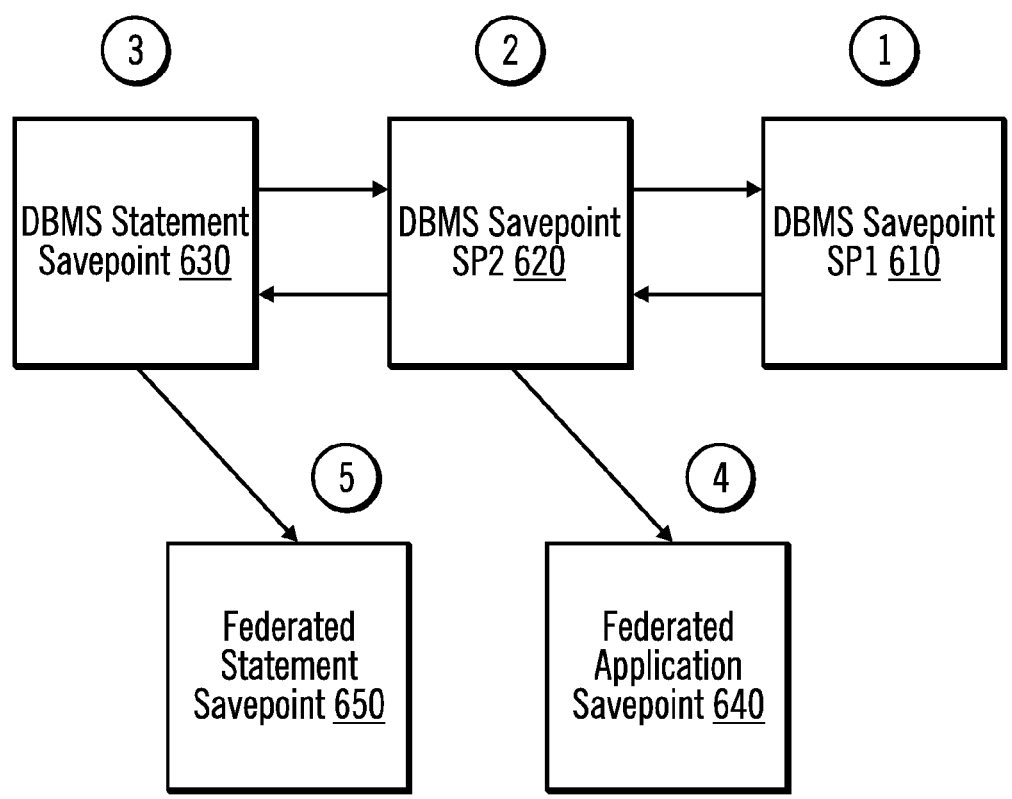
FIG. 6 illustrates a two-tiered linked list in accordance with certain embodiments.

FIG. 6 illustrates a two-tiered linked list in accordance with certain embodiments. FIG. 6 corresponds to the event sequence of execution of three SQL statements:

1) SAVEPOINT SP1;
2) SAVEPOINT SP2;
3) INSERT INTO NN_T1 SELECT * FROM LOC_T1;

When a SAVEPOINT SP1 statement is received, a linked list element for a DBMS savepoint SP1 610 is created (e.g., a DB2® savepoint is created). Each linked list element includes a next arrow pointing to a next linked list element and a previous arrow pointing from another linked list element. When a SAVEPOINT SP2 statement is received, a linked list element for DBMS savepoint SP2 620 is created. When the statement: INSERT into NN_T1 SELECT * FROM LOC_T1 is received, a linked list element for DBMS statement savepoint 630 is created. The linked list elements 610, 620, and 630 are coupled via the previous and next arrows illustrated in FIG. 6. In addition, when the INSERT statement is received, a linked list element that points to a federated application savepoint 640 is created and is anchored under linked list element 620 (i.e., the federated application savepoint is connected to the DBMS savepoint SP2). Also, when the INSERT statement is received, a linked list element for a federated statement savepoint 650 is created and is anchored under the linked list element 630. Thus, FIG. 6 illustrates a two-tiered linked list.

With embodiments, the lifetime of a statement savepoint is for the duration of that statement. Once the statement execution completes, the statement savepoint goes away. In FIG. 6, that means savepoints 630 and 650 will go away at the end of the INSERT statement, whereas the application savepoint exists until it is explicitly released or the transaction is ended.

FIGS. 7A, 7B, 7C, and 7D illustrate logic performed for a request federated application savepoint in accordance with certain embodiments. To improve the overall processing overhead and performance, the relationship between an application savepoint and a federated application savepoint is an N to 1 relationship, where N may be one (if single) or more than one (if nested).

Figure 7A:
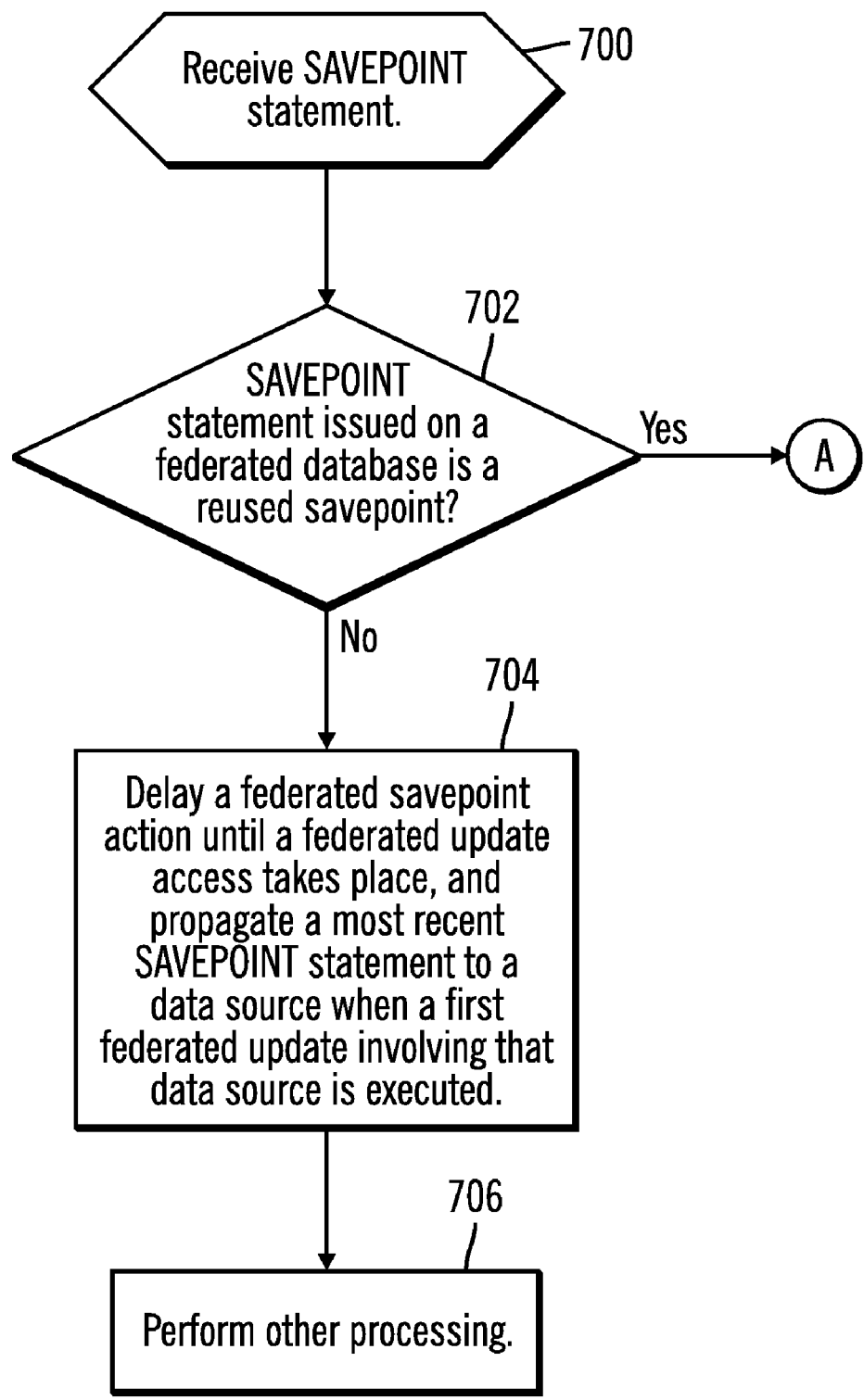
FIGS. 7A, 7B, 7C, and 7D illustrate logic performed for a request federated application savepoint in accordance with certain embodiments.
Figure 7B:
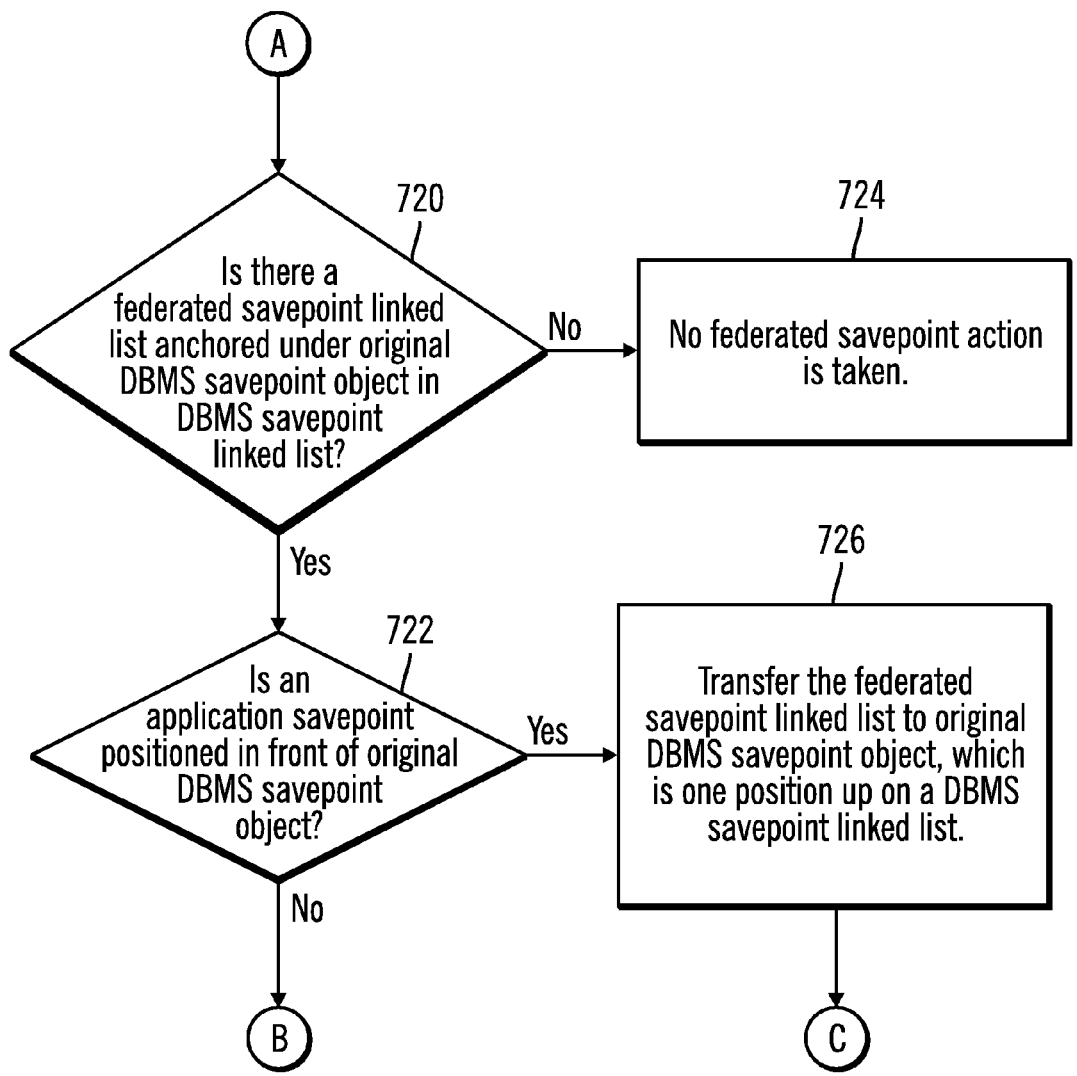

In FIG. 7A, control begins at block 700 with a DBMS receiving a savepoint statement. In block 702, the DBMS determines whether the savepoint statement issued on a federated database is a reused savepoint. A reused savepoint is one that has been used more than once (e.g., there are multiple SAVEPOINT sp1 statements). If the savepoint is reused, processing continues to block 720 (FIG. 7B), otherwise, processing continues to block 704.

In block 704, the DBMS delays a federated savepoint action until a federated update access takes place. Then, the DBMS propagates a most recent savepoint statement to a data source when a first federated update involving that data source is executed.

Thus, when the savepoint is not a reused savepoint, the DBMS does not take federated action immediately. Instead, the federated savepoint action is delayed until a federated update access takes place. Regardless of how many nested savepoints have been taken on the federated database, one savepoint statement (which corresponds to the last application savepoint closest to the current statement savepoint) is propagated to the data source when the first federated update involving that data source is executed.

In block 706, the DBMS performs other processing.

When the savepoint statement issued on the federated database is a reused savepoint and, depending on the position of an original DBMS savepoint object that matches the savepoint name, the processing varies. A savepoint object contains information about the savepoint. "Original" refers to an old position of a reused savepoint object on the DBMS savepoint linked list.

In block 720 (FIG. 7B), the DBMS determines whether there is a federated savepoint linked list anchored under an original DBMS savepoint object in a DBMS savepoint linked list. If so, processing continues to block 722, otherwise, processing continues to block 724. If there is no federated savepoint linked list anchored under the original DBMS savepoint object, no federated savepoint action is taken (block 724).

Figure 7C:
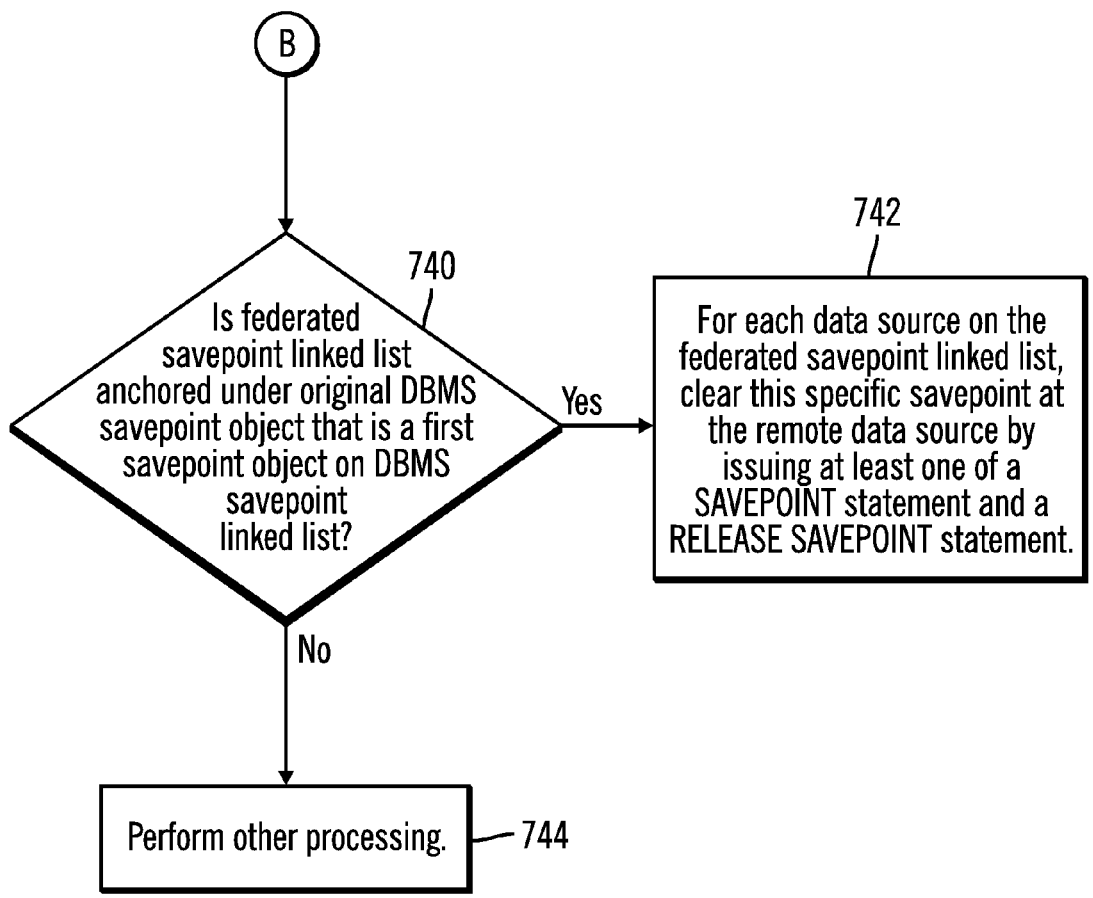
Figure 7D:
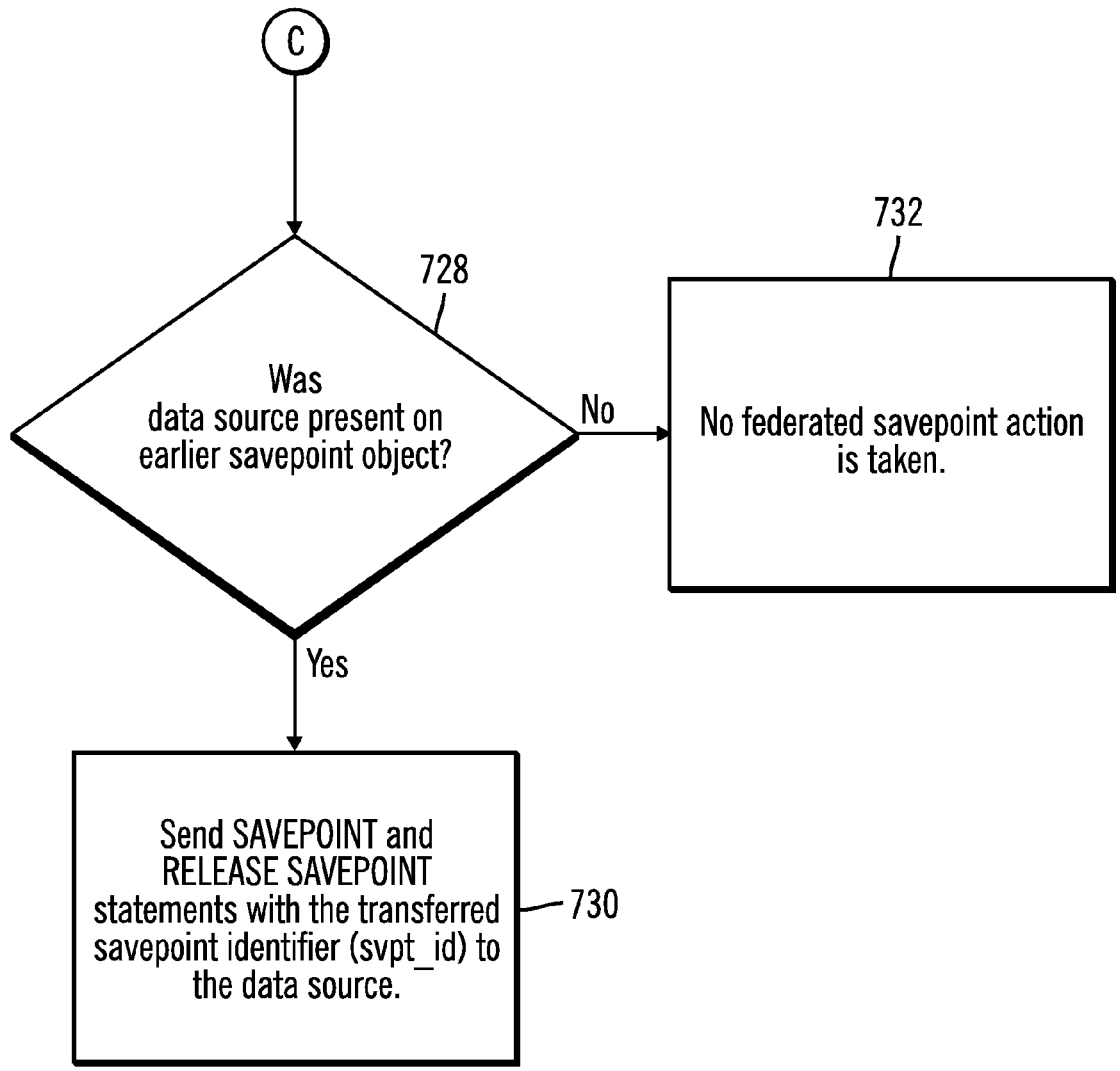

In block 722, the DBMS determines whether an application savepoint is positioned in front of an original DBMS savepoint object. If so, processing continues to block 726, otherwise, processing continues to block 740 (FIG. 7C). Thus, if there is a federated savepoint linked list anchored under the original DBMS savepoint object, but there still is an application savepoint positioned in front of the original DBMS savepoint object, then the DBMS transfers the federated savepoint linked list to the original DBMS savepoint object, which is one position up on a DBMS savepoint linked list (block 726). From block 726, processing continues to block 728.

In block 728, the DBMS determines whether the data source was present on an earlier savepoint. If so, processing continues to block 730, otherwise, processing continues to block 732. Thus, if the data source was not present on the earlier savepoint object, then no federated savepoint action is taken (block 732).

In block 730, if the same data source was present on the earlier savepoint object, then the DBMS sends SAVEPOINT and RELEASE SAVEPOINT statements with the transferred savepoint identifier (svpt_id) to the data source (i.e., to move up a savepoint position and clear the savepoint on the data source side in any manner in which the data source implements this functionality). A savepoint identifier is a savepoint name known to the data source. The savepoint name is specified in SAVEPOINT and RELEASE SAVEPOINT statements so that the data source knows which savepoint to establish (for SAVEPOINT) and to release (for RELEASE SAVEPOINT). These savepoint statements are sent to the data source so the actions take place on the data source side.

In block 740, the DBMS determines whether there is a federated savepoint linked list anchored under the original DBMS savepoint object that is a first savepoint object on an DBMS savepoint linked list. If so, processing continues to block 742, otherwise, processing continues to block 744. In block 742, for each data source on the federated savepoint linked list, the DBMS clears a specific savepoint at a remote data source by issuing at least one of a SAVEPOINT statement and a RELEASE SAVEPOINT statement. In particular, there may be multiple savepoints established on a data source side. The SAVEPOINT and RELEASE SAVEPOINT statements sent to the data source provide the specific savepoint to reuse (SAVEPOINT) or to release (RELEASE SAVEPOINT). The SAVEPOINT statement is used to move the position of the savepoint entry to the tail of the savepoint linked list on the data source side, and the RELEASE SAVEPOINT statement is used to clear the specific savepoint entry.

In block 744, the DMBS performs other processing.

Figure 8:
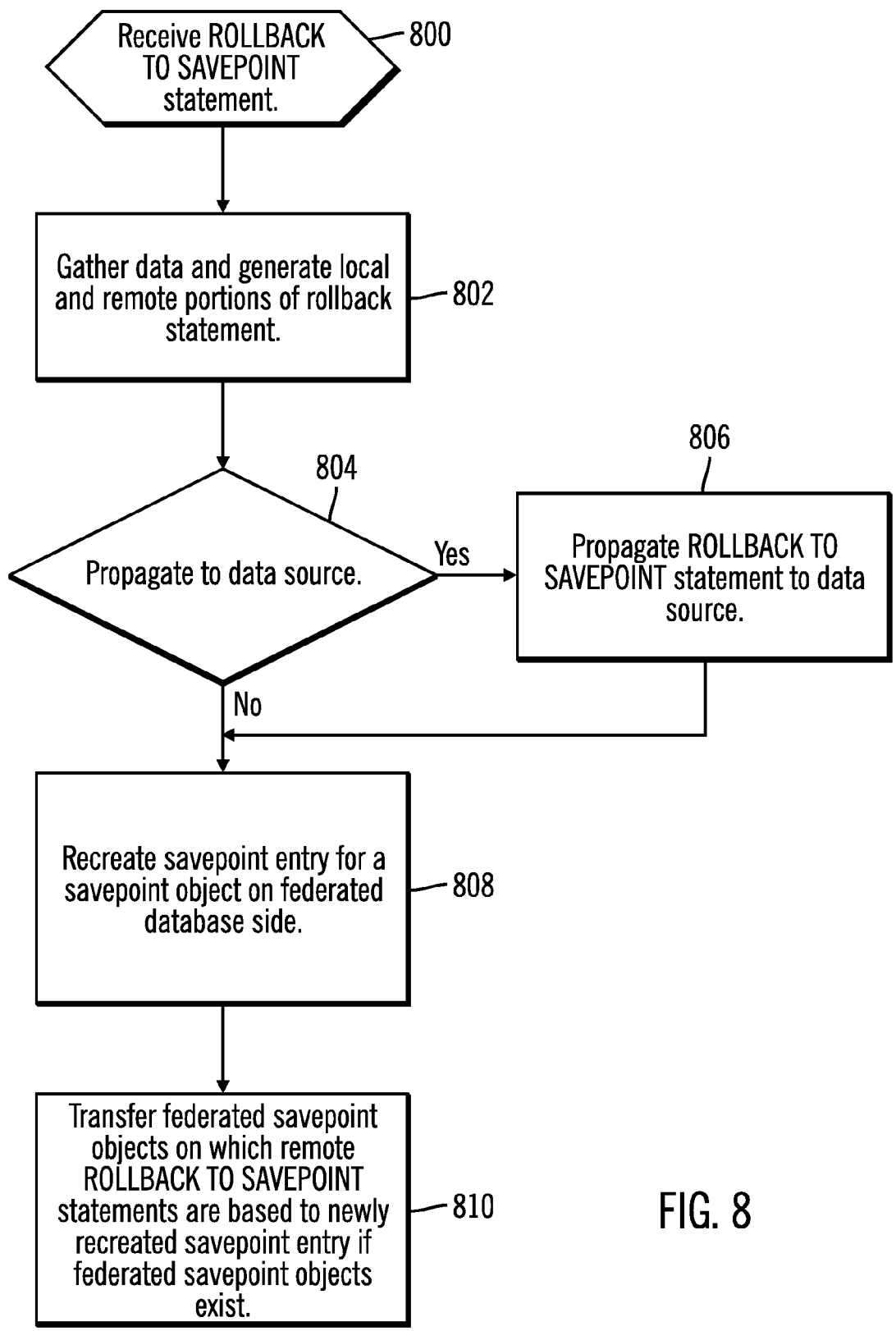
FIG. 8 illustrates logic performed for rollback of a federated application savepoint in accordance with certain embodiments.

FIG. 8 illustrates logic performed for rollback of a federated application savepoint in accordance with certain embodiments. Control begins at block 800 with the DBMS receiving a ROLLBACK TO SAVEPOINT statement. In block 802, the DBMS gathers data and generates local and remote portions of a rollback statement. In particular, federated savepoints relevant to a certain data source starting from the DBMS savepoint object with the specified savepoint name and onward are gathered together. The savepoint name used on a remote ROLLBACK TO SAVEPOINT statement is the earliest svpt_id value for that data source on the gathered savepoint information. That is, if there have been multiple savepoints issued to the data source, the DBMS picks the one that is closest to the DBMS savepoint to be rolled back.

In block 804, the DBMS determines whether to propagate the ROLLBACK TO SAVEPOINT statement to one or more data sources. If so, processing continues to block 806, otherwise, processing continues to block 808. The ROLLBACK TO SAVEPOINT statement is propagated to the data source if there is a federated savepoint object with a server name matching the data source anchored on either the original or any subsequent DBMS savepoint object. In block 806, the DBMS propagates the ROLLBACK TO SAVEPOINT statement to the data source and processing continues to block 808.

In block 808, once the rollback to savepoint is complete, the DBMS recreates a savepoint entry for a savepoint object on the federated database side (in the new position on the DBMS savepoint linked list). In block 810, the DBMS transfers the federated savepoint objects (on which remote ROLLBACK TO SAVEPOINT statements are based) to the newly recreated DBMS savepoint entry if the federated savepoint objects exist (i.e., the ROLLBACK TO SAVEPOINT statement is propagated in block 806).

Figure 9A:
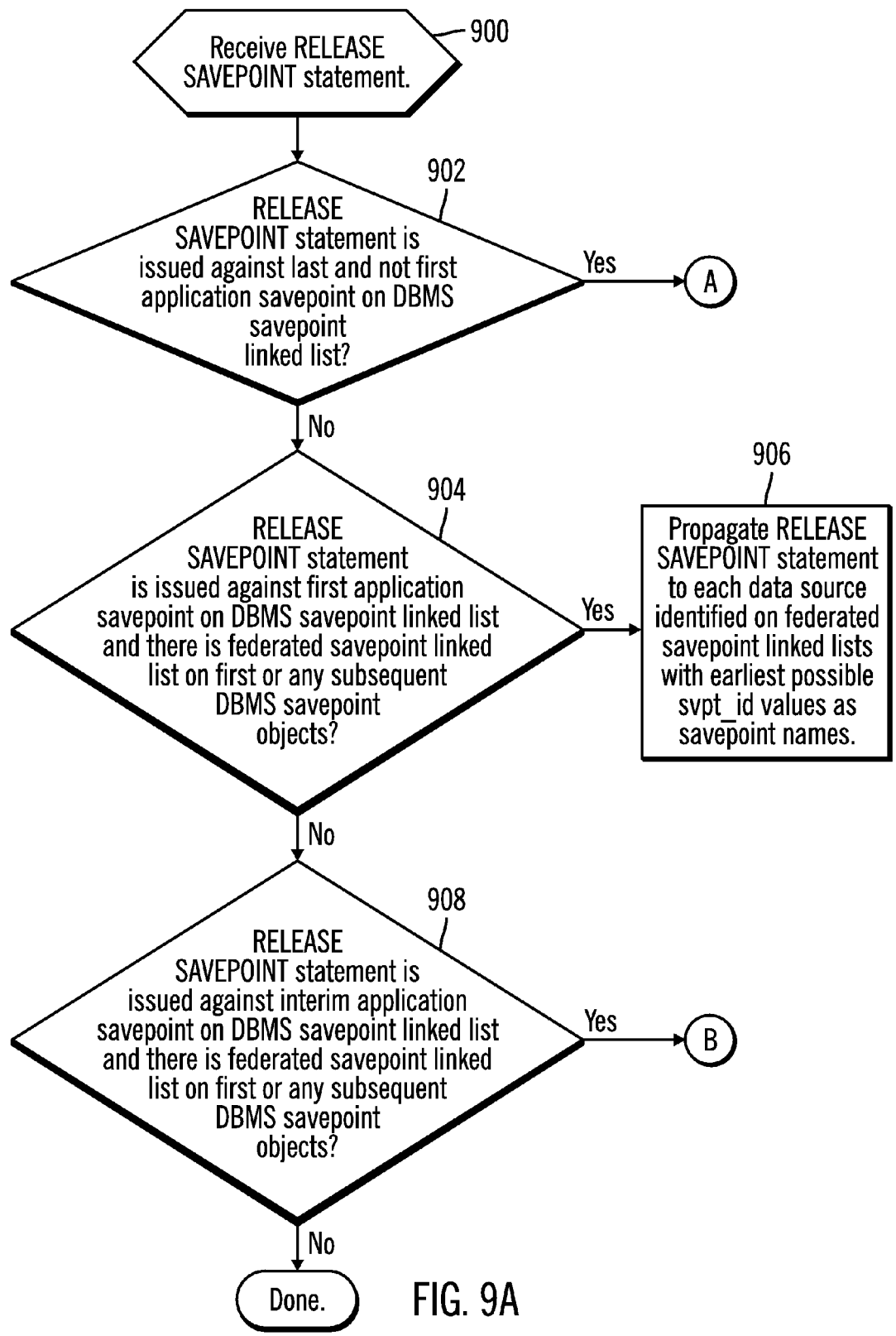
FIGS. 9A, 9B, and 9C illustrate logic performed for release savepoint in accordance with certain embodiments.
Figure 9B:
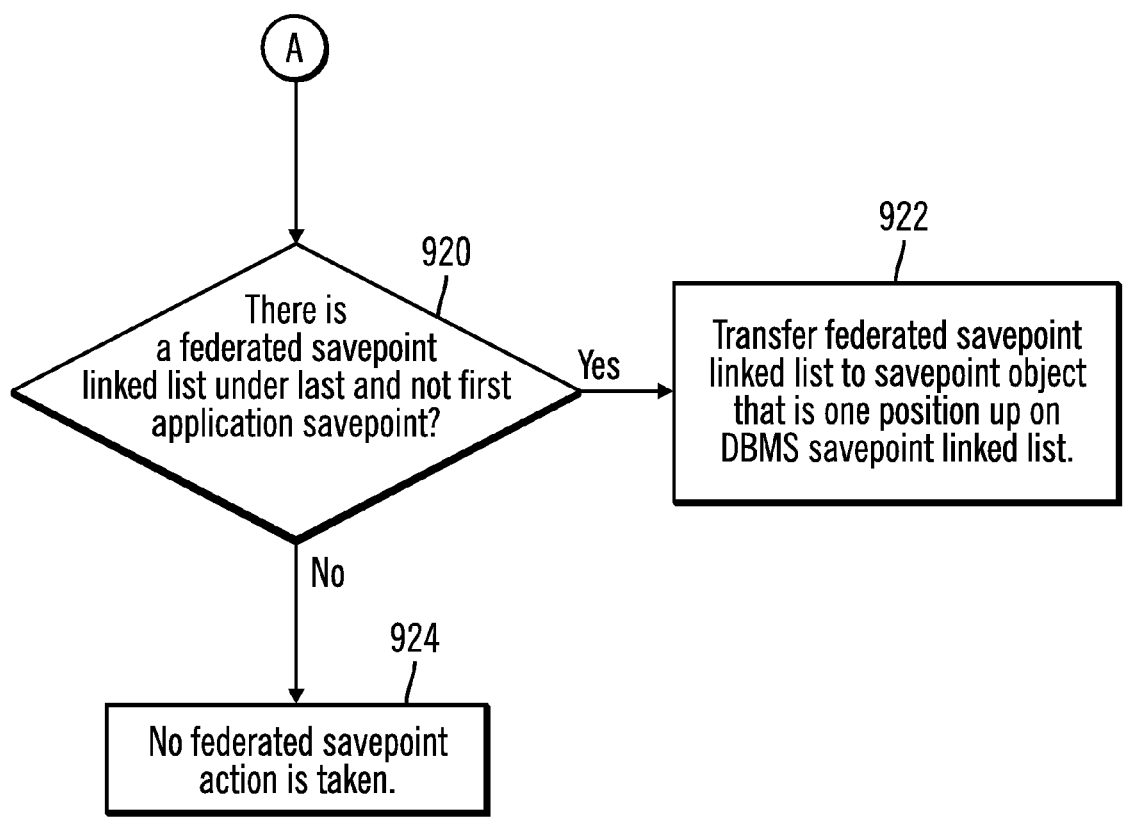
Figure 9C:
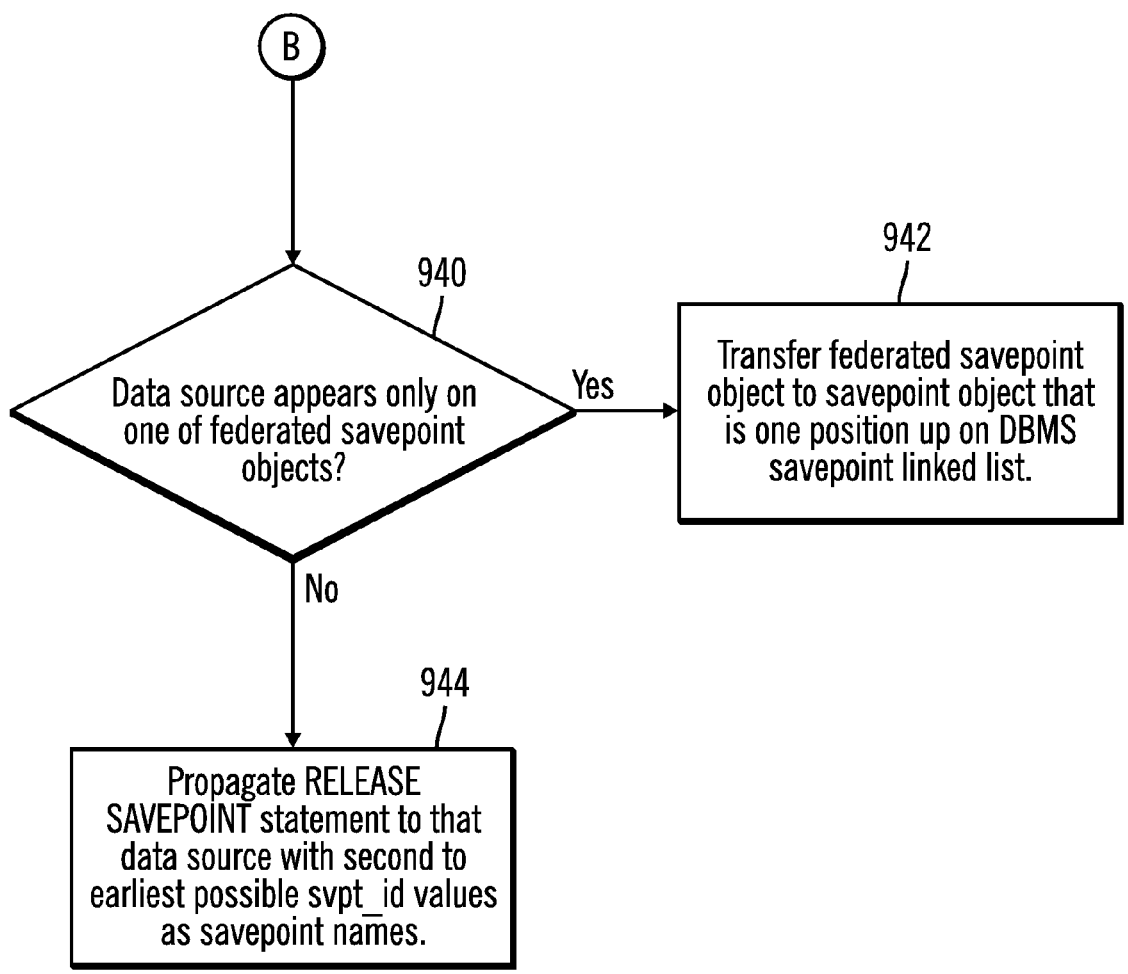

FIGS. 9A, 9B, and 9C illustrate logic performed for release savepoint in accordance with certain embodiments. Control begins at block 900 with the DBMS receiving a RELEASE SAVEPOINT statement. In block 902, the DBMS determines whether the RELEASE SAVEPOINT statement is issued against the last and not first application savepoint on the DBMS savepoint linked list. If so, processing continues to block 920 (FIG. 9B), otherwise, processing continues to block 904.

In block 920, the DBMS determines whether there is a federated savepoint linked list under a last and not first application savepoint. If so, processing continues to block 922, otherwise, processing continues to block 924. In block 922, the DBMS transfers the federated savepoint linked list to the savepoint object that is one position up on the DBMS savepoint linked list. In block 924, the DBMS takes no federated savepoint action.

In block 904, the DBMS determines whether a RELEASE SAVEPOINT statement is issued against a first application savepoint on the DBMS savepoint linked list and there is a federated savepoint linked list on a first or any subsequent DBMS savepoint objects. If so, processing continues to block 906, otherwise, processing continues to block 908. In block 906, the DBMS propagates the RELEASE SAVEPOINT statement to each data source identified on the federated savepoint linked lists with the earliest possible svpt_id values as the savepoint names.

In block 908, the DBMS determines whether a RELEASE SAVEPOINT statement is issued against an interim application savepoint on the DBMS savepoint linked list and there is a federated savepoint linked list on the interim or any subsequent DBMS savepoint objects. If so, processing continues to block 940 (FIG. 9C), otherwise, processing is done. In block 940, the DBMS determines whether a data source appears only on one of the federated savepoint objects. If so, processing continues to block 942, otherwise, processing continues to block 944. In block 942, the DBMS transfers the federated savepoint object to the savepoint object that is one position up on the DBMS savepoint linked list. In block 944, since the data source appears more than once (i.e., more than one DBMS savepoint objects have a federated savepoint object with this data source anchored underneath), the DBMS propagates the RELEASE SAVEPOINT statement to that data source with the second to earliest possible svpt_id values as the savepoint names.

Thus, the RELEASE SAVEPOINT statement is propagated to a data source under certain conditions.

FIGS. 10A, 10B, and 10C illustrate an example 1000, 1010, 1020 in accordance with certain embodiments. FIGS. 10A, 10B, and 10C illustrate an example demonstrating the consequence of a savepoint request (either brand new savepoint name or reuse existing savepoint name) to a remote data source. There are three savepoints established, SP1, SP2, and SP3. Later in the example, two out of the three savepoints are re-established. Events 5a and 5b are mutually exclusive, and event 6 occurs if event 5a occurs first.

Thus, embodiments introduce a new federated savepoint name resolution technique to uniquely identify each savepoint on each site in a nested savepoint environment. Embodiments also introduce a new federated savepoint transport technique to eliminate unnecessary traffic so that only savepoint statements that should be propagated to a data source are propagated.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 4, 5, 7A, 7B, 7C, 7D, 8, 9A, 9B, and 9C describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 4, 5, 7A, 7B, 7C, 8, 9A, 9B, and 9C may be implemented in software, hardware, programmable and non-programmable gate array logic or in some combination of hardware, software, or gate array logic.

Figure 11:
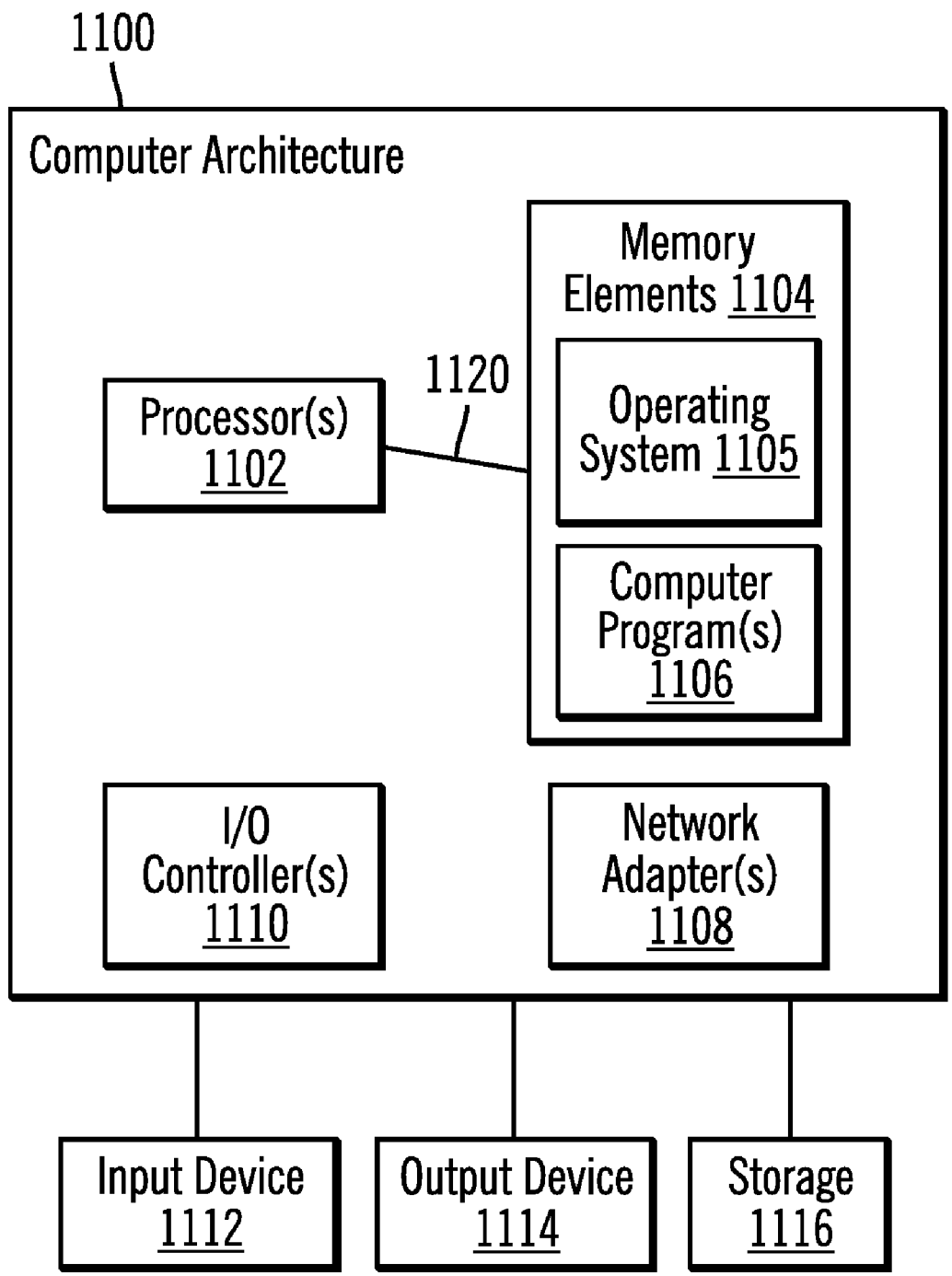
FIG. 11 illustrates a system architecture that may be used in accordance with certain embodiments.

FIG. 11 illustrates a system architecture 1100 that may be used in accordance with certain embodiments. Any of the illustrated clients or DBMSs may implement system architecture 11 00. The system architecture 1100 is suitable for storing and/or executing program code and includes at least one processor 1102 coupled directly or indirectly to memory elements 1104 through a system bus 1 120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The system architecture 1100 may be coupled to storage 1116 (e.g., a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The system architecture 1100 may include fewer components than illustrated, additional components not illustrated herein, or some combination of the components illustrated and additional components. The system architecture 1100 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:

preserving, using a computer including a processor, savepoint information in a two-tiered data structure with a first tier comprising a DataBase Management System (DBMS) savepoint linked list including at least one DBMS savepoint object and with a second tier comprising a federated savepoint linked list that is connected to a DBMS savepoint object in the DBMS savepoint linked list; and in response to determining that a savepoint statement issued on a federated database is a reused savepoint, that there is a federated savepoint linked list anchored under an original DataBase Management System (DBMS) savepoint object in the DBMS savepoint linked list, and that there is an application savepoint positioned in front of the original DBMS savepoint object, transferring the federated savepoint linked list to a DBMS savepoint object that is one position up on the DBMS savepoint linked list; and in response to determining that there is not an application savepoint positioned in front of the original DBMS savepoint object and that the federated savepoint linked list is anchored under the original DBMS savepoint object and is a first savepoint object on the DBMS savepoint linked list, for each data source on the federated savepoint linked list, clearing a savepoint at a remote data source by issuing at least one of a savepoint statement and a release savepoint statement, wherein the savepoint statement is used to move the position of the savepoint entry to a tail of a savepoint linked list on the data source side and the release savepoint statement is used to clear a specific savepoint.

2. The method of claim 1, further comprising:

in response to determining that a savepoint statement issued on a federated database is not a reused savepoint, delaying a federated savepoint action until a federated update access takes place and propagating a most recent savepoint statement to a data source when a first federated update involving that data source is executed.

3. The method of claim 1, further comprising:

in response to determining that a data source was present on an earlier savepoint object, sending a savepoint statement with a transferred savepoint identifier to the data source.

4. The method of claim 1, further comprising:

in response to determining that a rollback to savepoint statement was received, that there is a federated savepoint object with a server name matching a second data source anchored on either an original DataBase Management System (DBMS) savepoint object or any subsequent DBMS savepoint object in a DBMS savepoint linked list, propagating the rollback to savepoint statement to a data source.

5. The method of claim 1, further comprising:

recreating a savepoint object on a federated database side; and transferring any existing federated savepoint objects on which remote rollback to savepoint statements are based to the recreated savepoint entry.

6. The method of claim 1, further comprising:

in response to determining that a release savepoint statement is received and is issued against a first application savepoint on the DBMS savepoint linked list and there is a federated savepoint linked list on a DBMS savepoint object, propagating the release savepoint statement to a data source.

7. The method of claim 6, further comprising:

in response to determining that the release statement is for a last and not the first application savepoint from a set of application savepoints on the DBMS savepoint linked list and that there is a federated savepoint linked list under the last and not the first application savepoint, transferring the federated savepoint linked list to a savepoint object that is one position up on the DBMS savepoint linked list; and in response to determining that the release statement is for an interim application savepoint from the set of application savepoints, that there is a federated savepoint linked list on a DBMS savepoint object, and that the data source appears on one of the federated savepoint objects, transferring the federated savepoint object to a savepoint object that is one position up on the DBMS savepoint linked list.

8. The method of claim 1, further comprising:

transforming an inbound application savepoint name of a received savepoint statement into a unique federated application savepoint name; and issuing the savepoint statement to the data source using the unique federated application savepoint name.

9. The method of claim 1, further comprising:

generating a unique federated statement savepoint name for an internally generated statement savepoint; and issuing the savepoint statement to the data source using the unique federated statement savepoint name.

10. A computer program product comprising a computer readable-medium including a computer readable program, wherein the computer readable-medium is a member of a set of computer readable media consisting of a semiconductor or solid state memory, magnetic tape, a removable computer diskette, a rigid magnetic disk, an optical disk, a magnetic storage medium, volatile and non-volatile memory devices, wherein the computer readable program when executed on a computer causes the computer to:

preserve savepoint information in a two-tiered data structure with a first tier comprising a DataBase Management System (DBMS) savepoint linked list including at least one DBMS savepoint object and with a second tier comprising a federated savepoint linked list that is connected to a DBMS savepoint object in the DBMS savepoint linked list; and in response to determining that a savepoint statement issued on a federated database is a reused savepoint, that there is a federated savepoint linked list anchored under an original DataBase Management System (DBMS) savepoint object in the DBMS savepoint linked list, and that there is an application savepoint positioned in front of the original DBMS savepoint object, transfer the federated savepoint linked list to a DBMS savepoint object that is one position up on the DBMS savepoint linked list; and in response to determining that there is not an application savepoint positioned in front of the original DBMS savepoint object and that the federated savepoint linked list is anchored under the original DBMS savepoint object and is a first savepoint object on the DBMS savepoint linked list, for each data source on the federated savepoint linked list, clear a savepoint at a remote data source by issuing at least one of a savepoint statement and a release savepoint statement, wherein the savepoint statement is used to move the position of the savepoint entry to a tail of a savepoint linked list on the data source side and the release savepoint statement is used to clear a specific savepoint.

11. The computer program product of claim 10, wherein the computer readable program when executed on a computer causes the computer to:

in response to determining that a savepoint statement issued on a federated database is not a reused savepoint, delay a federated savepoint action until a federated update access takes place and propagating a most recent savepoint statement to a data source when a first federated update involving that data source is executed.

12. The computer program product of claim 10, wherein the computer readable program when executed on a computer causes the computer to in response to determining that a rollback to savepoint statement was received, that there is a federated savepoint object with a server name matching a second data source anchored on either an original DataBase Management System (DBMS) savepoint object or any subsequent DBMS savepoint object in a DBMS savepoint linked list, propagate the rollback to savepoint statement to a data source.

13. The computer program product of claim 10, wherein the release statement is received and wherein the computer readable program when executed on a computer causes the computer to:

in response to determining that a release savepoint statement is received and is issued against a first application savepoint on the DBMS savepoint linked list and there is a federated savepoint linked list on a DBMS savepoint object, propagate the release savepoint statement to a data source.

14. The computer program product of claim 13, wherein the computer readable program when executed on a computer causes the computer to:

in response to determining that the release statement is for a last and not the first application savepoint from a set of application savepoints on the DBMS savepoint linked list and that there is a federated savepoint linked list under the last and not the first application savepoint, transferring the federated savepoint linked list to a savepoint object that is one position up on the DBMS savepoint linked list; and in response to determining that the release statement is for an interim application savepoint from the set of application savepoints, that there is a federated savepoint linked list on a DBMS savepoint object, and that the data source appears on one of the federated savepoint objects, transferring the federated savepoint object to a savepoint object that is one position up on the DBMS savepoint linked list.

15. The computer program product of claim 10, wherein the computer readable program when executed on a computer causes the computer to:

in response to determining that a data source was present on an earlier savepoint object, send a savepoint statement with a transferred savepoint identifier to the data source.

16. The computer program product of claim 10, wherein the computer readable program when executed on a computer causes the computer to:

recreate a savepoint object on a federated database side; and transfer any existing federated savepoint objects on which remote rollback to savepoint statements are based to the recreated savepoint entry.

17. The computer program product of claim 10, wherein the computer readable program when executed on a computer causes the computer to:

transform an inbound application savepoint name of a received savepoint statement into a unique federated application savepoint name; and issue the savepoint statement to the data source using the unique federated application savepoint name.

18. The computer program product of claim 10, wherein the computer readable program when executed on a computer causes the computer to:

generate a unique federated statement savepoint name for an internally generated statement savepoint; and issue the savepoint statement to the data source using the unique federated statement savepoint name.

19. A system, comprising:

hardware logic performing operations, the operations comprising:

preserving savepoint information in a two-tiered data structure with a first tier comprising a DataBase Management System (DBMS) savepoint linked list including at least one DBMS savepoint object and with a second tier comprising a federated savepoint linked list that is connected to a DBMS savepoint object in the DBMS savepoint linked list; and in response to determining that a savepoint statement issued on a federated database is a reused savepoint, that there is a federated savepoint linked list anchored under an original DataBase Management System (DBMS) savepoint object in the DBMS savepoint linked list, and that there is an application savepoint positioned in front of the original DBMS savepoint object, transferring the federated savepoint linked list to a DBMS savepoint object that is one position up on the DBMS savepoint linked list; and in response to determining that there is not an application savepoint positioned in front of the original DBMS savepoint object and that the federated savepoint linked list is anchored under the original DBMS savepoint object and is a first savepoint object on the DBMS savepoint linked list, for each data source on the federated savepoint linked list, clearing a savepoint at a remote data source by issuing at least one of a savepoint statement and a release savepoint statement, wherein the savepoint statement is used to move the position of the savepoint entry to a tail of a savepoint linked list on the data source side and the release savepoint statement is used to clear a specific savepoint.

20. The system of claim 19, wherein the operations further comprise:

in response to determining that a savepoint statement issued on a federated database is not a reused savepoint, delaying a federated savepoint action until a federated update access takes place and propagating a most recent savepoint statement to a data source when a first federated update involving that data source is executed.

21. The system of claim 19, wherein the operations further comprise:

in response to determining that a rollback to savepoint statement was received, that there is a federated savepoint object with a server name matching a second data source anchored on either an original DataBase Management System (DBMS) savepoint object or any subsequent DBMS savepoint object in a DBMS savepoint linked list, propagate the rollback to savepoint statement to a data source.

22. The system of claim 19, wherein the release statement is received and wherein the operations further comprise:

in response to determining that a release savepoint statement is received and is issued against a first application savepoint on the DBMS savepoint linked list and there is a federated savepoint linked list on a DBMS savepoint object, propagating the release savepoint statement to a data source.

23. The system of claim 22, wherein the operations further comprise:

in response to determining that the release statement is for a last and not the first application savepoint from a set of application savepoints on the DBMS savepoint linked list and that there is a federated savepoint linked list under the last and not the first application savepoint, transferring the federated savepoint linked list to a savepoint object that is one position up on the DBMS savepoint linked list; and in response to determining that the release statement is for an interim application savepoint from the set of application savepoints, that there is a federated savepoint linked list on a DBMS savepoint object, and that the data source appears on one of the federated savepoint objects, transferring the federated savepoint object to a savepoint object that is one position up on the DBMS savepoint linked list.

24. The system of claim 19, wherein the operations further comprise:

in response to determining that a data source was present on an earlier savepoint object, sending a savepoint statement with a transferred savepoint identifier to the data source.

25. The system of claim 19, wherein the operations further comprise:

recreating a savepoint object on a federated database side; and transferring any existing federated savepoint objects on which remote rollback to savepoint statements are based to the recreated savepoint entry.

26. The system of claim 19, wherein the operations further comprise:

transforming an inbound application savepoint name of a received savepoint statement into a unique federated application savepoint name; and issuing the savepoint statement to the data source using the unique federated application savepoint name.

27. The system of claim 19, wherein the operations further comprise:

generating a unique federated statement savepoint name for an internally generated statement savepoint; and issuing the savepoint statement to the data source using the unique federated statement savepoint name.

* * * * *